AUTOMATED FRYER

Filed Oct. 4, 1965 8 Sheets-Sheet 1

INVENTORS.
HENRY C. CONGELLI
GORDON W. HAYS
BY
Arthur J. Plantamura
ATTORNEY.

AUTOMATED FRYER

Filed Oct. 4, 1965

INVENTORS.
HENRY C. CONGELLI
GORDON W. HAYS
BY
Arthur J. Plantamura
ATTORNEY.

AUTOMATED FRYER

Filed Oct. 4, 1965

INVENTORS.
HENRY C. CONGELLI
GORDON W. HAYS
BY
Arthur J. Plantamura
ATTORNEY.

INVENTORS.
HENRY C. CONGELLI
GORDON W. HAYS
BY
Arthur J Plantamura
ATTORNEY.

Oct. 17, 1967 H. C. CONGELLI ET AL 3,347,152

AUTOMATED FRYER

Filed Oct. 4, 1965 8 Sheets-Sheet 5

INVENTORS.
HENRY C. CONGELLI
GORDON W. HAYS

BY Arthur J. Plantamura

ATTORNEY.

INVENTORS.
HENRY C. CONGELLI
GORDON W. HAYS
BY
Arthur J. Plantamura
ATTORNEY.

Oct. 17, 1967 H. C. CONGELLI ET AL 3,347,152

AUTOMATED FRYER

Filed Oct. 4, 1965 8 Sheets-Sheet 7

INVENTORS.
HENRY C. CONGELLI
GORDON W. HAYS

BY

Arthur J. Plantamura

ATTORNEY.

AUTOMATED FRYER

Filed Oct. 4, 1965

INVENTORS.
HENRY C. CONGELLI
GORDON W. HAYS
BY
Arthur J Plantamura
ATTORNEY.

United States Patent Office 3,347,152
Patented Oct. 17, 1967

3,347,152
AUTOMATED FRYER

Henry C. Congelli, Stamford, and Gordon W. Hays, Springdale, Conn., assignors to American Machine & Foundry Company, a corporation of New Jersey Filed Oct. 4, 1965, Ser. No. 492,742
6 Claims. (Cl. 99—334)

ABSTRACT OF THE DISCLOSURE

A cooking machine including:

A cooking tank with a fluid heater; and

A conveyor comprising an outer stator fixedly mounted on said tank with walls forming an endless passage partly received in said tank and comprising an inner rotor supported by said tank with a series of interconnecting pusher plates disposed in said passage.

This invention resides in improved machinery for automatically cooking and dispensing edible products such as French fried potatoes, chicken, shrimp, onion rings and the like. In a more specific embodiment the invention relates to an apparatus which may be incorporated into an automated system for preparing and dispensing an article of food ready for consumption by a customer.

The machinery of the invention is admirably adaptable to be included in remotely actuated systems of food preparing apparatus. Systems of this kind comprise a centrally located attended control station where orders for food items are received directly at the control station or by telephone at dining areas or by other voice communication means such as by a microphone at a drive-in station, and where through electronic ordering and billing equipment a plurality of different food preparation machines are commanded to simultaneously or individually cook and dispense food items.

The apparatus is characterized by its reliable on-demand capability. It is independently operable, that is, it is distinguished from continuous production units so that even though one or more hours may have elapsed since a prior item was dispensed, upon demand, it functions rapidly and dependably to dispense a single, or an indefinite plurality if items. Moreover, the machines of the invention differ from machines of the prior art such as those normally referred to as vending machines, in that it is capable of sequentially accepting and processing (simultaneously) a plurality of orders without waiting for completion of a previous order. A further characteristic resides in the control feature of a sequence of operations all of which may be appropriately triggered from a single electrical impulse which, in turn, through its inherent mechanism synchronously triggers later functions.

It is an object of the present invention to provide a novel machine for cooking food items.

It is another object of the invention to provide a novel apparatus capable of cooking, i.e. deep frying, food and dispensing the cooked food.

It is a further and more particular object of the invention to provide a self-contained automatic machine of this kind which may be readily incorporated in an electronic ordering and billing system so that upon remote command the machine feeds individual portions into cooking sections, automatically cooks the portion and thereafter delivers the cooked, assembled unit to a central assembly station.

It is yet a further object of the invention to provide a machine capable of accepting and processing individual independent orders and of accepting and processing successive orders for items at the same time that it is processing previous orders.

The above and other objects, features, and advantages of the invention will be better understood from the following detailed description thereof when it is considered in conjunction with the accompanying drawings in which.

Figure 1:
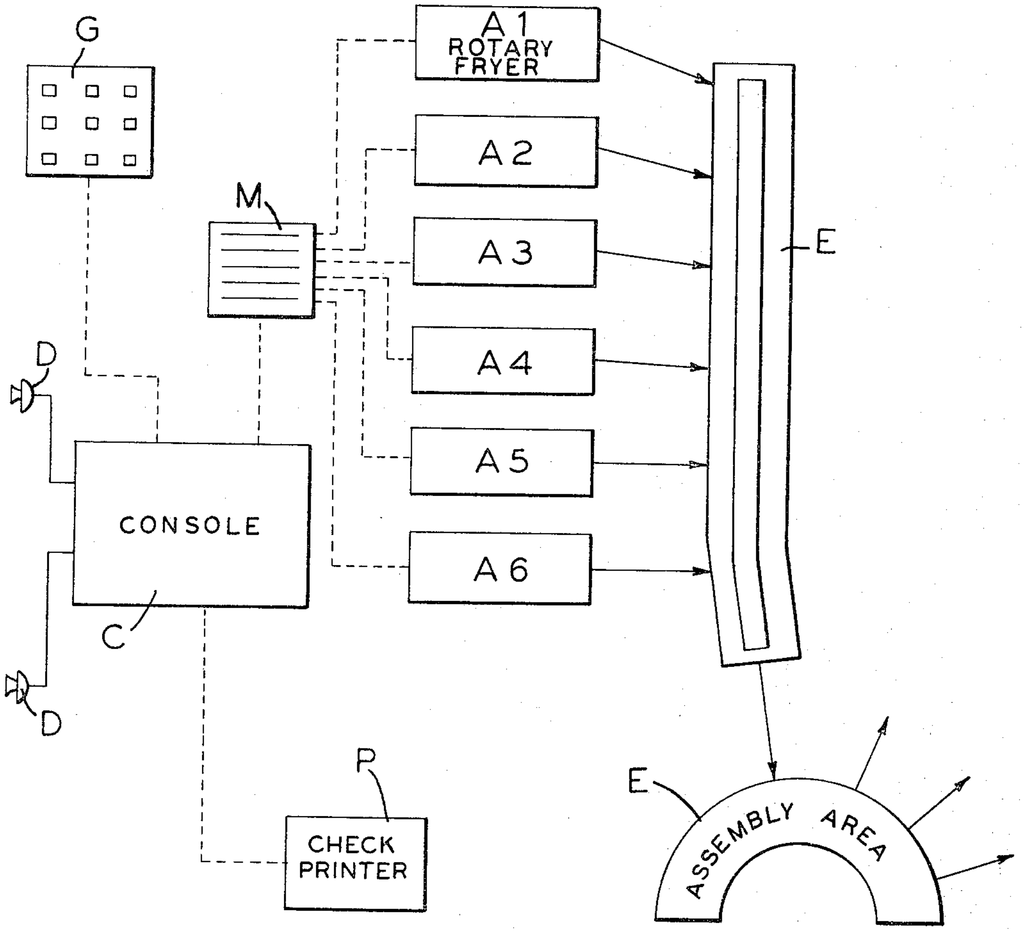
FIG. 1 is a schematic diagram of an automated system which includes the machine described hereafter in greater detail for deep frying portions of food wherein a control station provides the source for initiating (through an electrical system) the preparation and delivery of a plurality of food items to an assembly area.

The novel apparatus of the invention includes the capability of receiving portions of food by any convenient manner which includes feeding thereto portions manually or, and preferably, by using automated portioning apparatus and cooking and dispensing the individual portions fully automatically. More specifically, the apparatus of the invention has the capabilities of continuously accepting successive portions of food to be cooked in individual compartments wherein the portions are cooked under controlled temperature conditions, automatically dispensed and preferably delivered to a receiving station or delivery conveyor. While the apparatus may be used as a system component it is apparent that it may also comprise a discrete unit which may be used independently. Preferably, however, it is equipped to be keyed into a system in which the apparatus of the invention is remotely actuated electronically with other automatic food and drink preparation machines to offer a suitable menu as illustrated for example in FIG. 1.

In that diagram, the rotary frying machine of the invention is designated A1 and is shown in conjunction with five other machines A2 through A6 examples of which may be of the kind described in the following: The hamburger machine disclosed in the pending U.S. patent application of Udall et al., S.N. 220,615, now U.S. Patent No. 3,266,442 and the like. Generally the system which incorporates and synchronizes the electronic control system with the food preparing machines functions as follows:

Orders from outside sources, such as a dining room D and an outside drive-in parking lot O, are received by an attendant generally through remote voice communication at console C. The attendant enters the order into the console and thereby actuates the printer P which prints out a check. The printer is preferably conveniently situated contiguous to the assembly area E. When keys of the console C are actuated in entering orders, thereby providing necessary impulses to initiate operation of the automatic food processing machines, this actuation simultaneously enters the food orders into the memory M for the appropriate machines A1 through A6, respectively. The memory unit serves to rapidly accept and store, or backlog, a quantity of orders and feeds the orders individually into the machines when the machine is capable of accepting an order. As the order is accepted by the machine, the backlog stored in the memory is reduced by that order in process. A bank of electric order counters G records and provides a read-out of the number of orders passing through each machine to aid in inventory and machine replenishment schedules. The order and billing system likewise total the amount of billings.

After the order, processed by the machine, is delivered to the assembly area and assembled with its corresponding printed check, it is delivered by an attendant to the ordering customer.

Referring to the drawing and particularly to FIGS. 2 to 6, the invention comprises essentially a compartmented rotary apparatus in which separate compartments are provided to house individual portions of food while it is being cooked. The apparatus of the invention will be described in conjunction with the frying of French fried potatoes but it will be apparent that the invention may be employed in other food preparations such as chicken, fish, e.g. shrimp, onion rings and the like, as well as finding useful application in non-food dispensing purposes.

In the drawing, a circular assembly 21 is mounted in tank 22 by means of support brackets 23 and 24 and support hanger 25. The moving portions of wheel assembly 21 are driven by a drive assembly 70, each of which will be described in detail hereinafter. The tank 22, equipped to hold appropriate levels of cooking oil or fat, is mounted on fryer stand 20 which designates the structural framework supporting the entire machine.

The shape of the tank 22 is such as to hold vegetable or other cooking oils at a height approximately covering the center axle 45. Drainage of oil from tank 22 is accomplished by means of drain 28 located at the lowermost extremity 26 of tank 22. The shape of the tank 22 in its lower area 26 is preferably formed (as may be seen by reference to FIG. 2) in a sloping sump configuration where, especially near the bottom, a relatively cooler zone results. This shape promotes the settling of particles, crumbs, waste materials, etc. into this bottom zone, thereby minimizing carbonizing of particles or crumbs and extends the life of the cooking oil. Such particles are removed by draining the tank through a suitably sized drain line 28 and drain valve 29.

Figure 11:
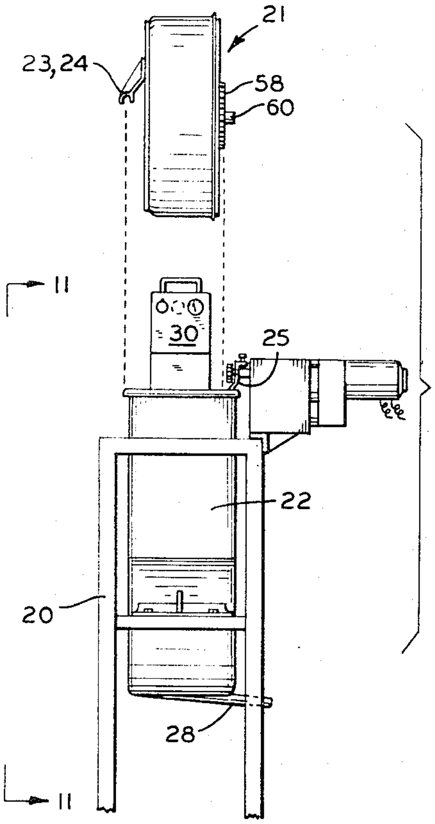
FIG. 11 is a view taken along line 11—11 of FIG. 10.
Figure 12:
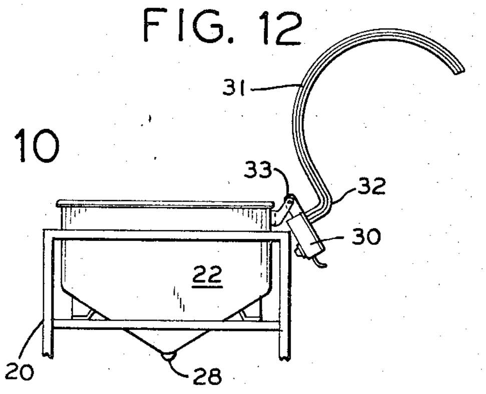
FIG. 12 is a view similar to FIG. 11 illustrating the heating element pivoted out of operable position.

The cooking oil contained in the tank 22 is heated by an array of electrical heating elements 31 carried by, and electrically connected together within, a heater control box 30. The heating elements 31 are shaped so as to generally conform to the outside periphery of wheel assembly 21, closely following its shape so as to minimize oil volume required by fry tank 22. These heater elements 31, to provide the optimum effect, are preferably in the form of curved U-shaped elements which follow the contour of the wheel assembly 21 when elements 31 are interposed underneath assembly 21 within the tank 22. The uppermost tip of heater elements 31, on the side opposite heater control box 30, is arranged to have a height slightly below that of the center line of axle 45 so that the curved end of heater 31 is fully immersed in the cooking liquid. The heated length of elements 31 does not begin until approximately three inches below the center line of axle 45, thus assuring continual submergence under the cooking oil of the heated portion of elements 31. The whole array of the heating elements 31 and heater control box 30 is pivotally mounted on pivot pin 33 so that (as shown in FIGS. 11 and 12) the heaters 31 may be pivotally swung out of the tank to afford easy access for cleaning both the tank and the heater elements without further disassembly of either, once the fry wheel assembly 21 has been lifted and removed from the fryer tank 22 as will be later described.

The heater control box 30 is equipped with a conventional temperature regulating mechanism including a control knob 34, over-temperature safety control 36 (shown in broken line) and temperature indicator 35 which, through capillary sensor bulbs immersed in the oil, serve to control, adjust and monitor the heating cycles of the cooking oil in tank 22 as demanded by cooking requirements.

The food product to be cooked is placed into the wheel assembly 21 through entrance chute 37. This introduction may be either manually or by suitable auxiliary mechanical apparatus. A suitable apparatus, for example, is the automatic food dispenser disclosed in the pending Brady et al. application Serial No. 284,456, now U.S. Patent No. 3,237,804 which issued Mar. 1, 1966. The food introduced at 37 is conveyed by vanes 55 which form a part of the rotary element A of the fryer wheel 21 (see FIG. 6), to a point where it is plugged under the surface of the hot oil contained in tank 22. After approximately 180° rotation of rotary element A, the cooked food emerges and is carried upward an additional 90° by rotary element A thereby allowing a brief period for drainage before the product then falls into and exits through opening 38 and down the attached exit chute 39 from which point it is picked up or delivered as by conveyor 65, preferably after being deposited in a receptacle 64 (see FIG. 4), to its desired destination.

In automated applications of the cooking apparatus, the attached extension exit chute 39 may be used in combination with a sensing gate 40 which is equipped with a sensing switch 41. The action of food being discharged past the sensing gate 40 and switch 41 may be used to trigger other desired cylic functions, such as the dispensing of a product receiving boat or container. A suitable auxiliary apparatus of this kind of automatically dispensing and presenting trays, into which the product prepared by the present invention from exit opening 38 and chute 39 may be introduced, is disclosed in the U.S. patent Ser. No. 285,742 application of Phillip Pollak, entitled "Tray Dispensing and Positioning Device," which was filed on June 5, 1962, now U.S. Patent No. 3,207,383.

Wheel assembly 21 (as may be seen more clearly by reference to FIGS. 5 and 6), comprises stationary wheel parts or elements B and rotating elements A. The stationary components B comprise a casting 43 provided with a hub area 48 which is adapted to receive the central axle 45. Axle 45 is secured in hub 48 by means of axle key 49 and axle adjustment nut 50. Bolted, or otherwise secured to stationary wheel casting 43, are support brackets 23 and 24 (FIGS. 2 and 5) which serve to support the stationary wheel portion B of the fryer wheel assembly 21 on the rim of tank 22. The wheel 43 also comprises a drum 51 preferably formed as an integral part (as by casting) of the wheel casting 43. Drum 51 which is a part of the stationary element, comprises the innermost surface of the radially disposed product entrapping compartments 44 which are formed between adjacent vane elements 55 (see FIG. 6). The outer radial, or peripheral walls, of the compartments 44 are formed by the annular part 53 of housing 52. The flat face 54 of housing 52 forms the side walls for the compartments 44. The combination of housing 52 and the outer face of drum 51 form the hollow cylindrical, or toroidal-like passageway, through which portions of the food product is passed as it is confined in distinct compartments 44 separated by vanes 55. Vanes 55 are carried in radially equally spaced relationship on mounting plate 56. Plate 56, which forms the compartment wall opposite 54 wall, is suitably secured to the wheel casting 42. These comprise the rotatable part A of wheel 21. Vanes 55 are preferably removably mounted on plate 56. Vanes 55 may be provided in units of two spaced vanes such as the generally U-shaped configuration (see FIG. 6A) so that the space between the U-shaped arms of vanes 55 and the similar space between the mounted positions of adjacent vane units, as mounted on mounting plate 56, form a series of generally equal sized product containing compartments 44. Vanes 55 are suitably secured by means of a spring clip arrangement such as the bayonet type (detachable by depressing a spring held plunger) which permits easy removal for cleaning.

The shape and profile of vanes 55 is designed so that the vanes are mounted with appropriate clearance within the hollow circular, or toroidal, channel formed by the drum 51 and housing 52 of stationary wheel 43. The vanes 55 are rotated within this channel by rotating wheel 42 which is driven by gear 58. Rotating wheel 42 is mounted on bearings 59 (see FIG. 5) and revolves upon axle 45. The assembly is retained upon axle 45 by the axle extension 60 and axle extension clamp screw 61. Bearings 59 are under axial tensioning which in the embodiment depicted, is provided by spring washer 62, to minimize mechanical play and retaining positioning of vanes 55 to run in a true fashion in the toroidal channel formed by the sides 51 and 52 and the bottom 54. An important feature of the invention resides in mounting assemblies A and B on the same center, i.e., all components forming the product.

Confining compartments 44 are mounted on the same axle. This affords advantages in fabrication with respect to control of operating fits and tolerances between moving parts.

Axle extension 60 is supported by support hanger 25 which is adjustably attached to the housing of the fryer drive assembly 70; the drive assembly 70 being suitably mounted to frame 20. The support provided by hanger 25 comprises the third point of a three point suspension for the fryer wheel assembly 21 to hold the wheel 21 in operable position in the container or tank 22. This three-point supporting scheme is advantageous in its ready assembly and disassembly capability. It affords excellent support for the fixed part B of wheel 21 which must resist rotation, and permits close location and centering of the entire wheel assembly 21 in the tank 22 and in its relationship with the heating elements 31.

Conveniently provided in shroud 52, at a suitable position above the level of the cooking liquids, is a feed inlet 37. Preferably this inlet is positioned off the 12 o'clock position and as near the 3 o'clock position (when viewed from the side of the drive assembly 70) as convenient to minimize the time after introduction and prior to the initiation of the actual cooking of the food. Upon a clockwise rotation of about three-fourths revolution, the product then falls by gravity through an opening 38 at about the 12 o'clock position. The opening 38 is formed in the inner drum 51. A chute 37 for the product to enter into compartments 44 separated by vanes 55, is formed in the housing 52. The product entering through inlet chute 37 is confined inside the shroud or inner wall 53 of housing 52 and by the outer wall of drum 51. The portion of food are kept separate by vanes 55 which move with respect to surfaces 51, 53 and 54 (see FIG. 6), as it is immersed in the oil.

Figures 3, 4:
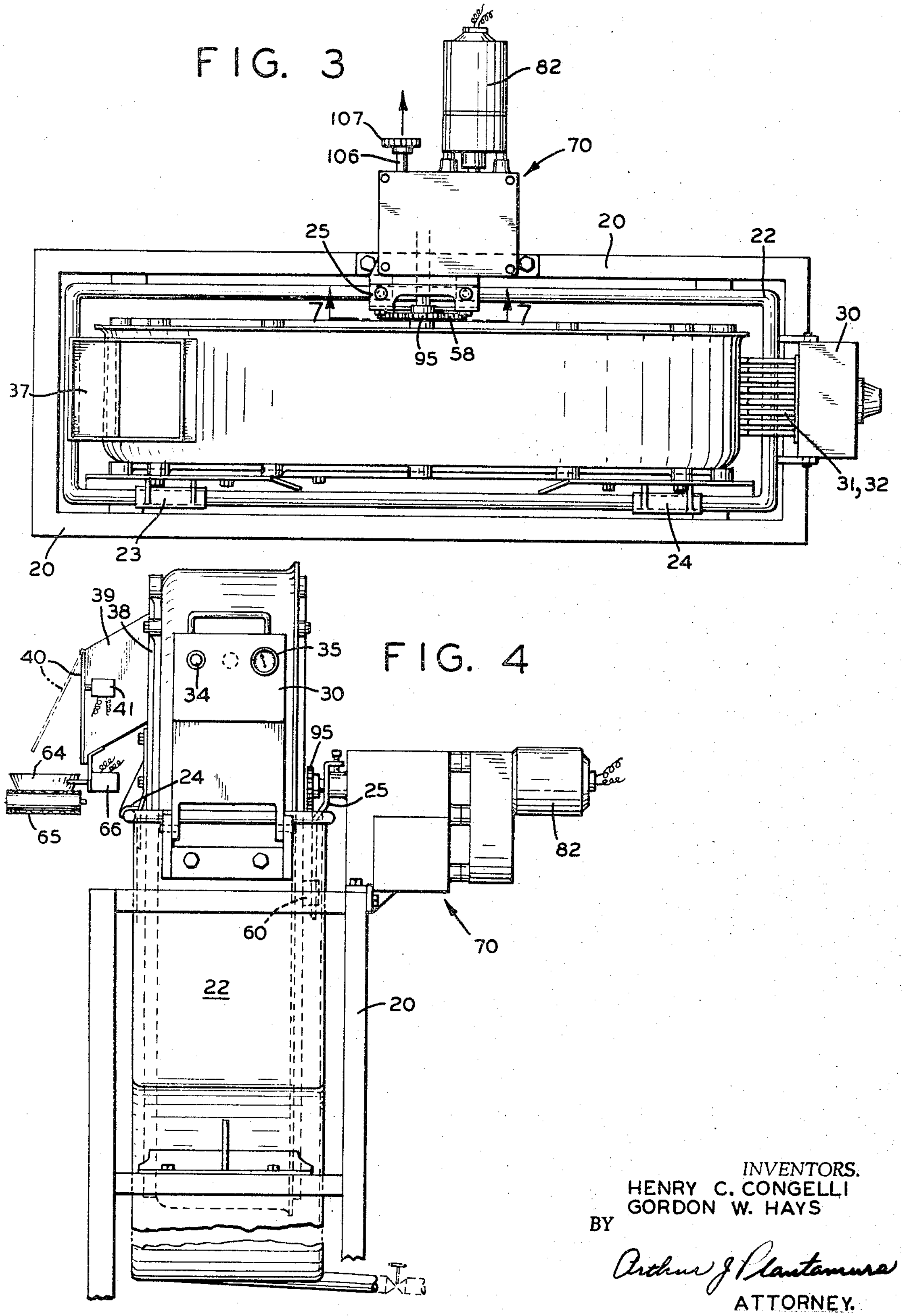
FIG. 3 is a plan view of the machine of FIG. 2 illustrating the drive mechanism.
FIG. 4 is an end elevational view of the machine shown in FIG. 3.

Suitable dispensing of take-away containers, e.g., trays, may be provided to receive the product exiting from opening 38 and chute extension 39 (see FIG. 4). Automatic operation of the dispensing of the receiving containers may be accomplished with an appropriate gate 40 and switch 41 arrangement to signal related functions such as the dispensing of the paper serving tray.

Figure 6:
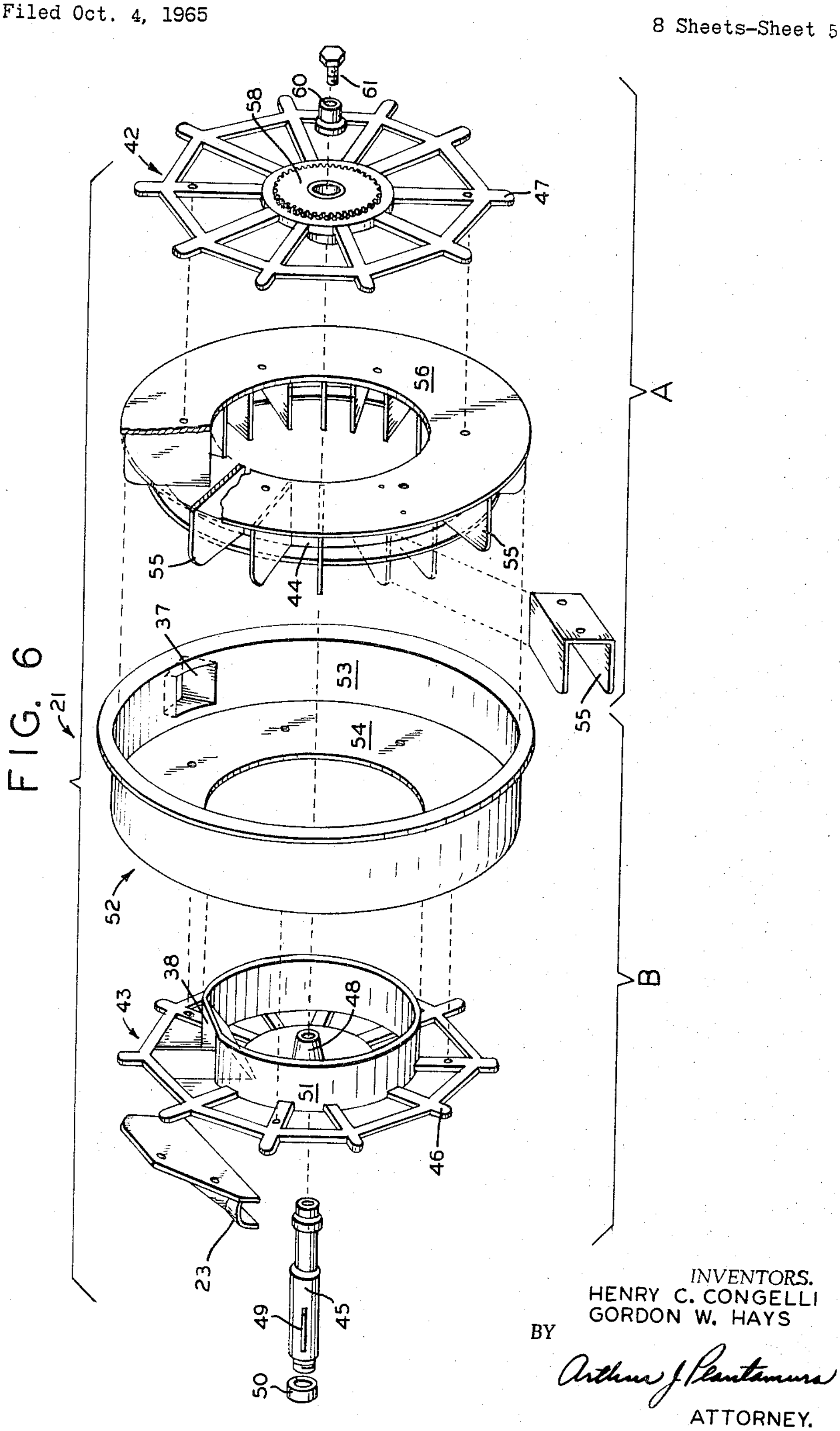
FIG. 6 is an exploded view of the wheel assembly.
Figure 7:
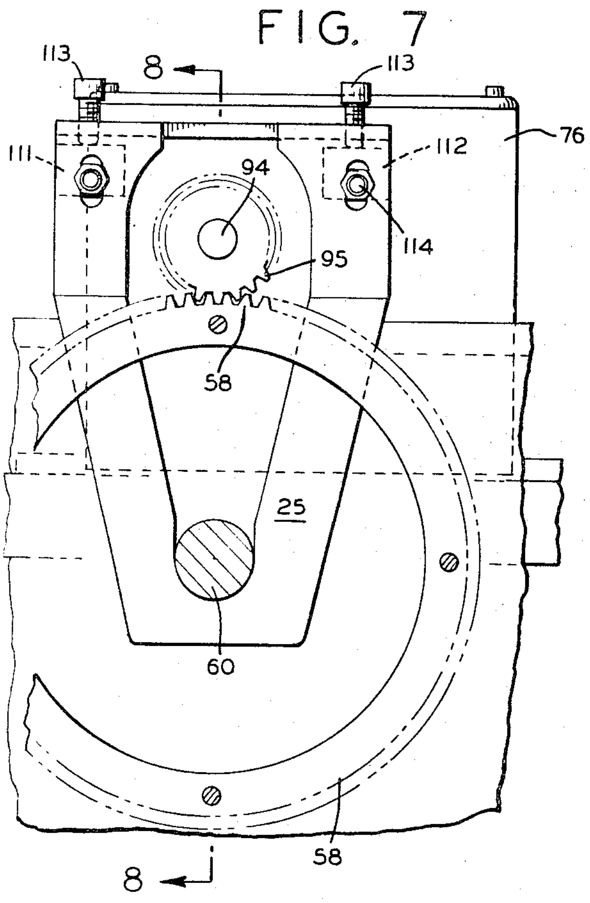
FIG. 7 is a sectional view taken substantially along line 7—7 of FIG. 3.

The construction of the wheel assembly 21 is summarized by reference to FIG. 6. As seen, housing 52 is bolted to finger-like extensions 46 of stationary wheel 43 which may conveniently be formed by casting. The inner periphery 53 of housing 52 and the outer face of the drum portion 51 of the wheel 43 form the outer and inner walls, respectively, of the cooking compartments 44. These compartments are separated by vanes 55. The flat stationary back wall 54 of element 52 (and movable wall 56) comprises the face area necessary to complete the product enclosing walls of compartments 44. The vane assemblies 55 are mounted on an annular disc 56 which in turn is mounted to and carried by the wheel element 42 which, like element 43, may be conveniently formed by casting. Element 42 is appropriately provided with finger-like extensions 47 similar to those designated 46 on element 43. Disc 56 is appropriately secured to extensions 47 so that with vanes 55 it comprises the movable assembly A.

Figure 5:
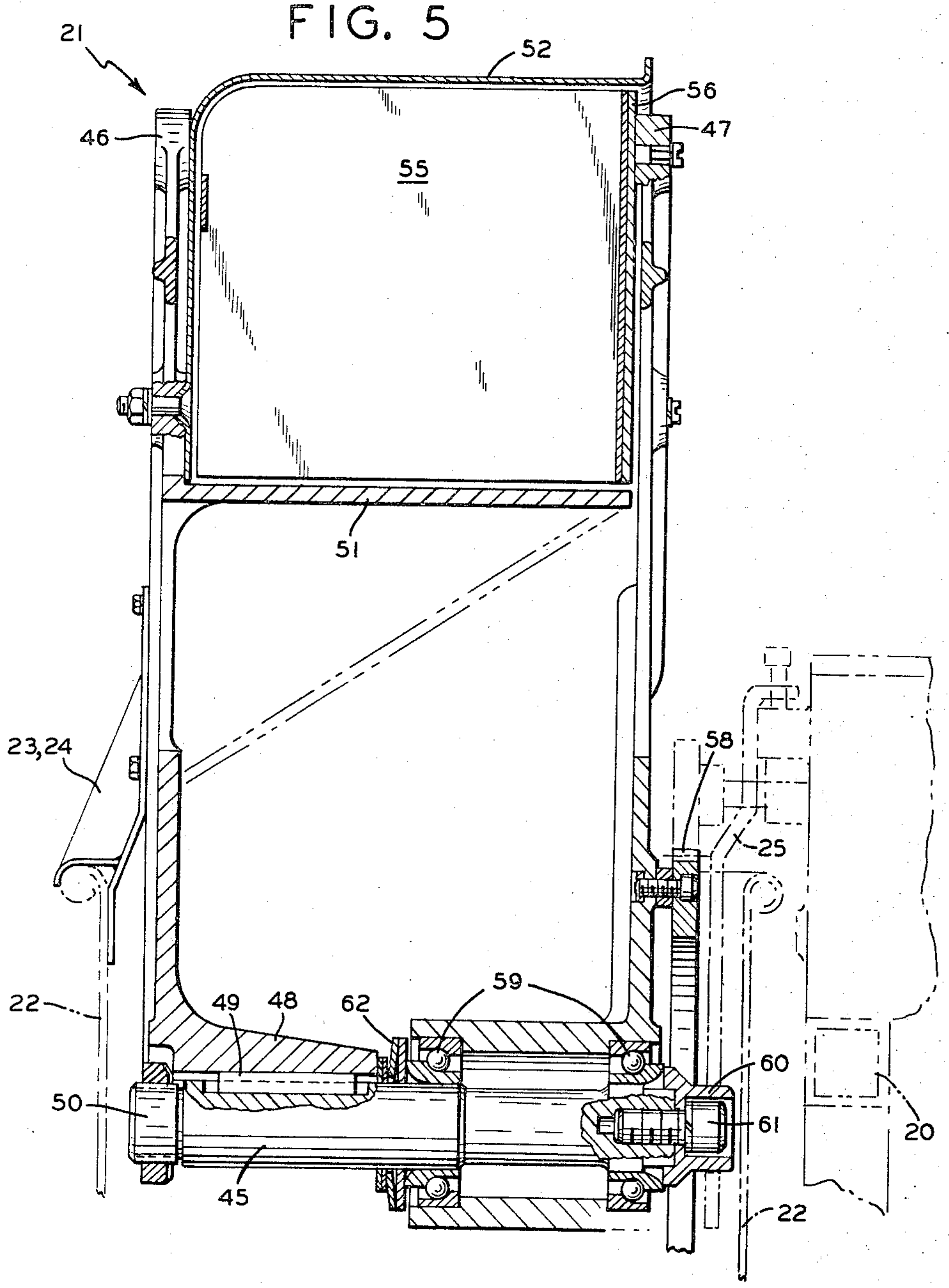
FIG. 5 is a sectional view taken substantially along line 5—5 of FIG. 2.

The entire wheel assembly 21 comprising relatively movable parts A housed in stationary parts B, are retained as a unit by axle 45. Axle 45, as shown, is provided on one end with axle adjustment nut 50 and on the other end with axle extension 60. A drive gear 58 may be formed as an integral part of rotating wheel casting 42 or, as depicted in FIG. 5, may be suitably bolted to wheel casting 42.

Once the elements depicted in FIG. 6 have been combined to form the unit 21, the assembly of the wheel unit 21 in tank 22 is illustrated by reference to FIG. 10 wherein it is seen that wheel 21 to which support brackets 23 and 24 are secured, is positioned ready for lowering into tank 22. Assembly 21 is supported at the proper depth in container 22 on one side by supports 23 and 24 which rest on the upper lip of tank 22 and on the opposite side by axle extension 60 which is designed to be supported on shaft support 25. The support at axial extension 60, afforded by shaft support 25, is adjustable and serves to appropriately locate and center assembly 21 in tank 22.

The rotatable part of wheel assembly 21 is driven through drive gear 58 by motor 82 through drive pinion 95. Drive assembly 70 is arranged to provide an intermittent motion mode to the cooking compartments 44. This intermittent motion provides a relatively short perid of the total cyclic time for movement of the compartments and a relatively long period of dwell time to enable the compartments to be loaded and unloaded while they are stationary. In the intermittent motion employed an abrupt stop is found advantageous. The result of an abrupt stop is such that the velocity imparted to the moving food product during its relatively short motion period is sufficient to give inertial effects i.e., to propel this product, thus aiding in better exit of the product carried in compartments 44 down chute 38. The relatively long dwell provided between motion cycles is desired to permit ample time for a product receiving container or boat to be placed under exit chute 39. This dwell permits receipt of the product into the container which is discharged from the fry wheel assembly without danger of spillage or partial loss of product from the container such as might otherwise occur if the wheel were in continuous motion. At the same time an advantage of this relatively long dwell period is that it provides ample time for automated loading of product into a stationary compartment as distinguished from a moving compartment delivery into which the feed might be interfered with by vanes 55. Also, timing problems with an otherwise moving compartment are thus minimized on the in-feed.

Figure 14:
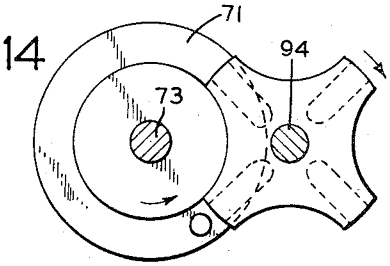
FIG. 14 is a sectional view taken along line 14—14 of FIG. 13.
Figure 15:
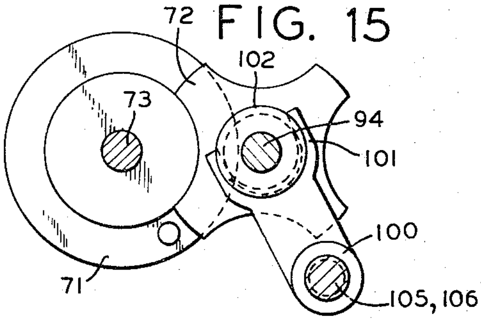
FIG. 15 is a sectional view taken along line 15—15 of FIG. 13.
Figure 16:
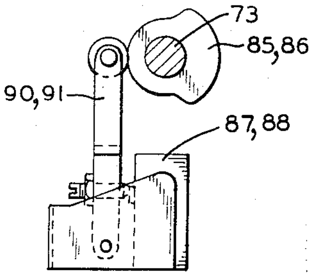
FIG. 16 is a sectional view taken along line 16—16 of FIG. 13.
Figure 13:
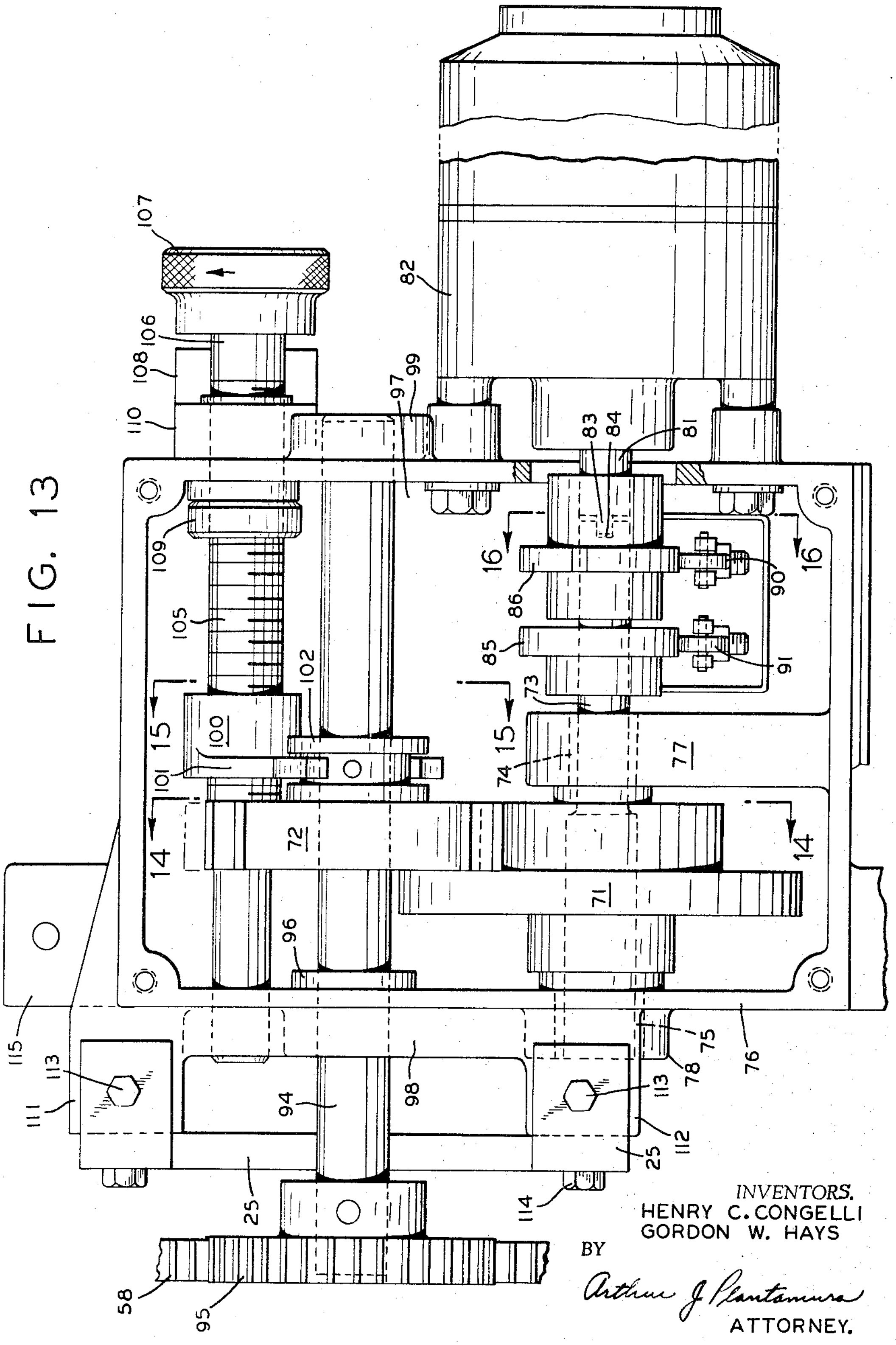
FIG. 13 is a plan view of intermittent drive mechanism.

This intermittent motion is afforded through a Geneva wheel mechanism which has the basic characteristic, in the selected embodiment depicted by reference to FIGS. 14 and 15, of a 25% move-75% dwell relationship. The drive wheel 71 of the Geneva driver engages with and drives the Geneva wheel 72. Geneva driver 71 is mounted upon shaft 73 which is carried by bushings 74 and 75 mounted in bosses 77 and 78 of drive housing 76 (FIG. 13). Geneva driver 71 is keyed to shaft 73. Shaft 73 is turned by shaft 81 of gear motor 82. The driving torque from gear motor 82 is transmitted to shaft 73 by means of a conventional tongue and groove connection 83 and 84 between shaft 81 and shaft 73, respectively. Carried upon shaft 73 are timing cams 85 and 86 which actuate switches 87 and 88 by means of switch actuators 90 and 91 (see FIG. 16). Switches 87 and 88 are not intended for control of drive motor 82 but serve rather to indicate the position of vanes 55 of wheel assembly 21 to cyclically initiate or monitor feed into, and discharge from, compartments 44 of assembly 21.

The overall mechanical ratio between the rotation of drive shaft 81 and rotation of the rotating wheel B of the wheel assembly 21 is such that precisely one complete revolution of drive motor shaft 81 advances vanes 55 one compartment. By using this exact ratio, it is seen that cams 85 and 86 may effectively monitor the actual position of the compartments 44 in a manner such that it is known when a product portion is due to be discharged from chute 38. Similarly, cyclic information if provided by switches 87 and 88 to enable compartments 44, formed by vanes 55, to receive incoming food product at entrance chute area 37 while these vanes are in a dwell period. Referring again to FIGS. 7–9 and 13–15, Geneva driver 71 is enmeshed with Geneva wheel 72. Geneva wheel 72 is secured as by pinning to drive pinion shaft 94, and when acted upon by Geneva driver 71 serves to rotate, in an intermittent fashion, drive pinion 95. It will be apparent that the number of compartments formed by the vanes 55 of the fry wheel assembly 21 may be varied. For example, when 24 compartments are formed as in this embodiment shown, the Geneva driver 71 and Geneva wheel 72, as depicted, is a four position device. The gear ratio selected between drive pinion 95 and drive gear 58 is 6:1; therefore, the products of these two ratios 4 and 6 is selected so that the overall mechanical ratio between the shaft 73 and the rotating elements of fry wheel assembly 21 is 24:1. A single revolution of drive motor shaft 81 thus advances the wheel assembly 21 precisely one compartment. Drive motor 82 may thus be continuously energized while cooking action is underway, causing drive shaft 81 to continuously drive the shaft 73 which, in turn by the Geneva mechanism, imparts a start-stop motion to drive pinion shaft 94. This intermittent motion applied to gear 95 provides, through gear 58, the desired cyclic motions to the compartments 44.

Figure 9:
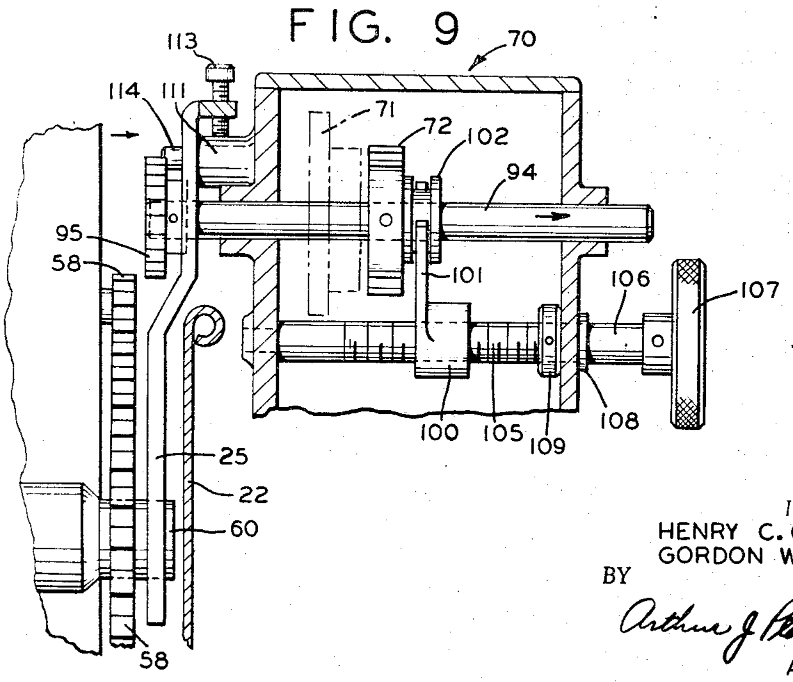
FIG. 9 is a view similar to FIG. 8 but with the drive gear retracted from engagement.

Drive pinion shaft 94 is not only rotatably mounted in bushings 96 and 97 carried in bosses 98 and 99 of the drive housing 76, but mounted also in a manner as to permit sliding in an axial direction of drive shaft 94. Positional engagement of the Geneva wheel 72 with its mating Geneva driver 71 is established by the engagement arms 101 of shifter fork 100 acting in shifter fork arm groove 102 on Geneva wheel 72. Shifter fork 100 is axially located on the threaded portion 105 of shaft 106, which in turn is axially located within housing 76 by clamp screw collar 108 and shaft collar 109. Clamp screw collar 108 is normally tightened against boss 110 of housing 76 thereby, together with shaft collar 109, restraining axial movement of threaded shaft 106. The action of screw clamp collar 108, together with shaft collar 109 acting upon threaded shaft 106, may be best seen by reference to FIG. 13. When clamp collar 108 is loosened allowing threaded shaft 106 to be turned by knob 107, turning of knob 107 causes shifter fork 100 to advance or retreat along the threaded portion 105 of the threaded shaft 106. When knob 107 is turned in a clockwise fashion as indicated by the arrow in FIG. 13, it serves to force shifter fork 100 to be drawn towards shaft collar 109. The movement of shifter fork 100 in this direction draws Geneva wheel 72 out of mesh with Geneva driver 71 and into such a position that it is free from the driver. Shifting of Geneva wheel 72 also through its pin attachment to drive pinion shaft 94, causes drive pinion 95 to be drawn out of mesh with drive gear 58 located immediately below. Reference to FIG. 9 shows drive 95 shifted out of mesh engagement with drive gear 58 by the retracting action of shifter fork 100.

Figure 8:
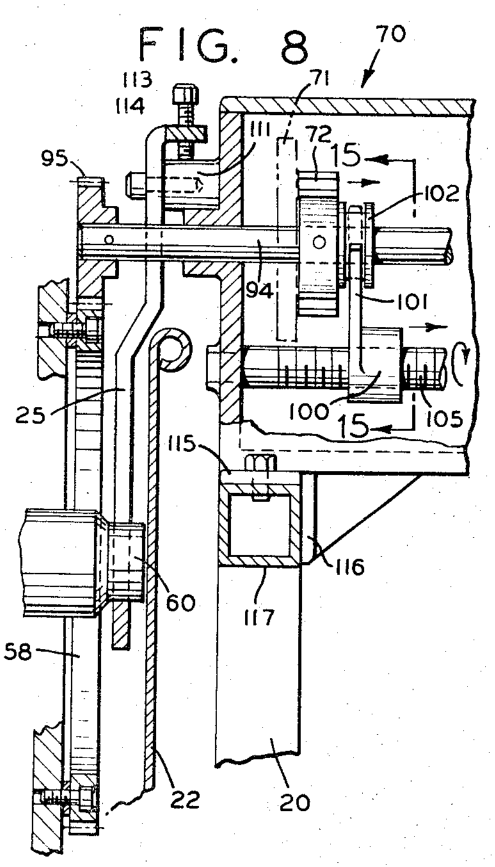
FIG. 8 is a sectional view taken substantially along line 8—8 of FIG. 7.
Figure 10:
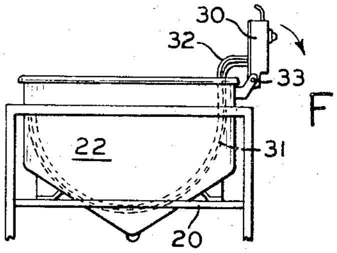
FIG. 10 is an end elevational view similar to FIG. 4 but depicted more schematically and showing the wheel assembly removed.

When the drive pinion 95 has been drawn out of mesh with drive gear 58, the entire wheel assembly 21 is free to be lifted vertically upward and out of its supported location in tank 22 (as shown in FIG. 10) for cleaning or other maintenance purposes. Registration markings may be provided on drive gear 58 (or other alternate markings may be utilized) so as to insure proper reassembly and reengagement of drive pinion 95 with drive gear 58. This assures proper re-establishment of timed relationship of the compartments formed by vanes 55 with chutes 37 and 38. It should be noted that when properly assembled, by reference to registration marks, no change in timed relationship occurs between the position of the compartments of the fryer wheel and the profiles of the cycle controlling cams 85 and 86. This eliminates the requirement to continually readjust timing at each periodic maintenance and cleaning period of the wheel. Mounted at 114 (see FIG. 7) to projecting bosses 111 and 112 of drive housing 76, is the support hanger 25 which as heretofore noted, supports, and locates, the fry wheel assembly 21 through extension 60 of axle 45. Hanger 25 seen by reference to FIG. 8 is unattached to container 22. Instead it is secured to drive housing 76 which in turn is attached to frame 20 at 117. Proper mesh of drive pinion 95 and drive gear 58 is achieved by jack screws 113 carried by support hanger 25 and acting against the upper sides of bosses 111 and 112. Rigid clamping of support hanger 25 to drive housing 76 is afforded by clamp screws 114. Drive housing 76 in turn is supported from horizontal cross bar 117 of main structural frame 20 by bolted arrangement means through attachment lugs 115 and 116 of drive housing 76.

Figure 17:
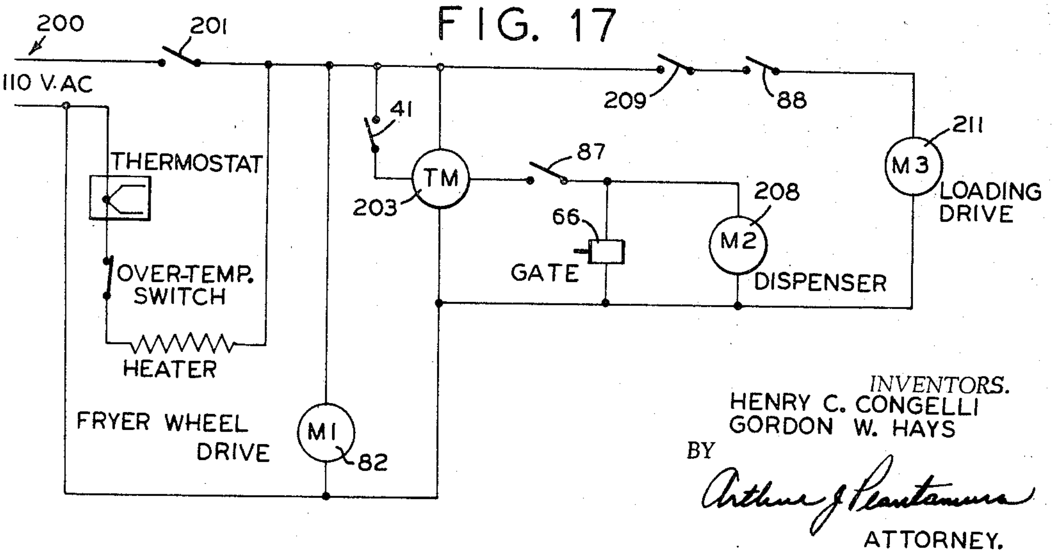
FIG. 17 is a schematic wiring diagram which is an aid in further describing the apparatus of the invention.
Figure 2:
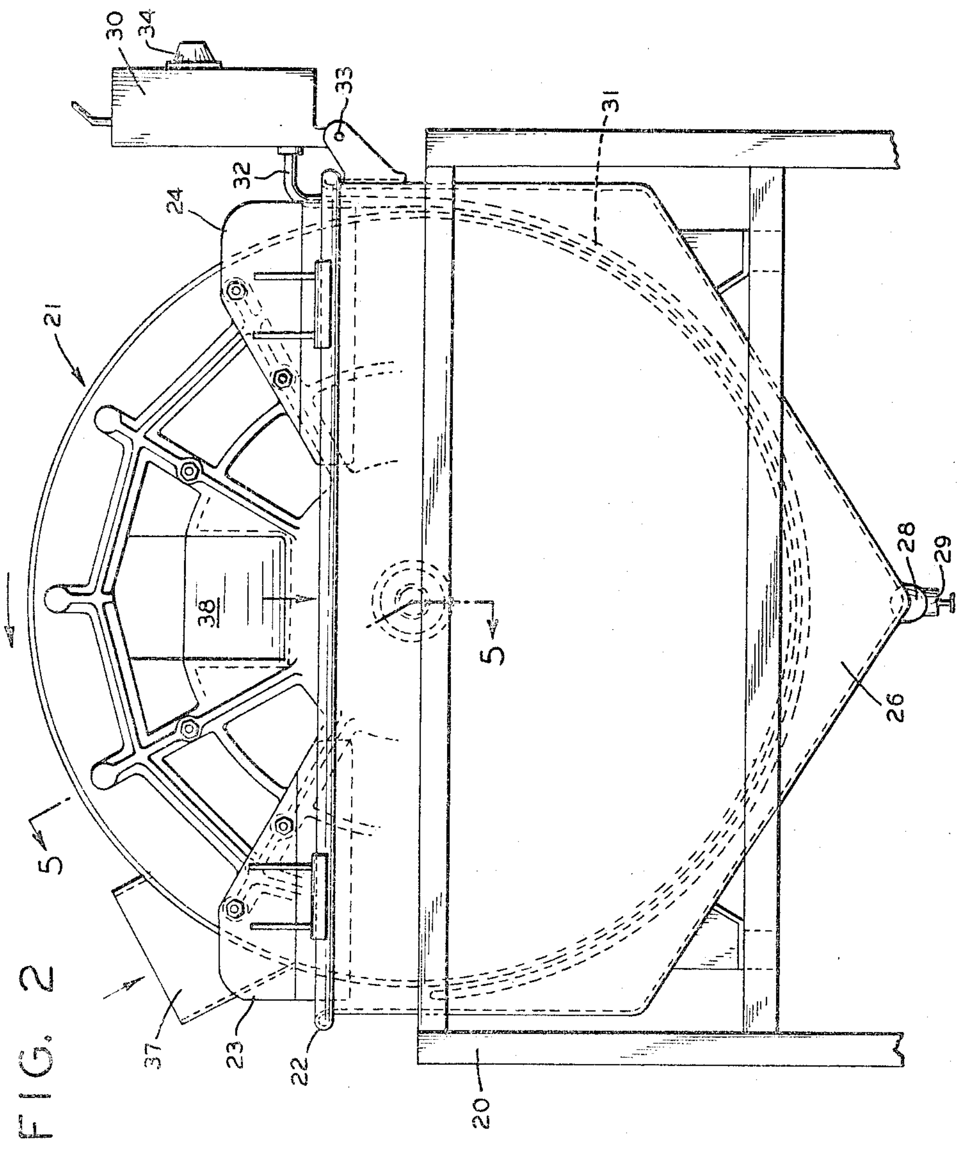
FIG. 2 is a front elevational view of the frying apparatus of the invention.

The diagram of FIG. 17 illustrates schematically the electrical interconnection of the apparatus of the invention.

The electrical system is described by reference to a one-line simplified electrical diagram of FIG. 17. The diagram is simplified so that conventional protective devices and circuitry (now shown) would be employed in implementing the device of the invention. Such items are readily contemplated and would be included as a standard practice by one skilled in the art based on the description and operation of the apparatus as hereinabove presented.

Starting with the on/off switch 201, power is obtained from the electrical power supply 200; through this supply electric power for all of the essential components is derived. The fryer heater 31 will be turned on and off in response to demands from the thermostatic control 34. The over-temperature limit switch 36 when actuated by an excessive temperature of the cooking oil, prevents further elevation of temperature by heater 31. This behaves as a safety device.

Proceeding to the fryer drive motor 82, this motor operates continually as long as switch 201 is on. However, since motion of the rotary compartmented wheel is intermittent, the incremental indexing of the fryer wheel from compartment to compartment is controlled by the mechanical Geneva drive described hereinabove in the specification.

Considering now the input of food to the fryer, a suitable loading device may be employed in feeding the food portion to be cooked and may be controlled, for example, by a demand switch 209, wheel compartment switch 88, and the loading drive 211. In order to actuate the loading drive 211, the demand switch 203 may be closed by suitable means such as the order billing electronic system described hereinbefore in reference to the pending application of Alpert et al. It is necessary also to satisfy the condition that a compartment 44 of the wheel 42 be available and aligned to receive the food. The compartments 44 are arranged so as to be suitably positioned by the previously mentioned Geneva drive mechanism. Closure of wheel compartment switch 88 completes the power circuit to loading drive 211, causing the loading drive to operate and feed a portion of the uncooked food into the compartments 44 of the wheel.

Considering the output of the device, it is necessary to sense food sliding down the chute 39; this occurs as the food contacts the gate 40. The gate switch 41 is momentarily closed by gate 40. In operation the following occurs: Gate switch 41 momentarily closes as food exits down chute 39, activating timer 203. This timer, not fully described, retains the signal of switch 41. When the position of vanes 55 is such that all motions of fryer wheel 21 has ceased, and the compartments 44 are in a dwell period, switch 87 in drive assembly 70 closes, causing solenoid actuated gate 66 to rise and permit conveyor 65 to carry away the product now deposited in awaiting container 64. As cam 85 continues to rotate and as drive motor 82 continues to run, switch 87 again opens, causing gate 66 to again hold a new container 64 positioned on conveyor 65 under exit chute 39. Simultaneously, with the above action, switch 87, also causes container dispensing means 208 (not described), to deliver the new container to this area under exit chute 39, awaiting a new cycle.

It will be apparent to those skilled in the art that various modifications may be made in the invention without departing from the scope of the invention. Accordingly, the invention is not to be limited except insofar as necessitated by the appended claims.

We claim:

1. An apparatus for immersing in a liquid a material contained in discrete compartments comprising:

a generally semi-cylindrical tank for containing liquid;
a circular element partially submerged in said tank;
an electric resistance heating element positioned in the tank and arranged so as to be submerged below liquid contained in the tank and between said circular element and the bottom of the tank;
means on said tank adapted to retain, partially submerged therein, on a horizontal axis, said circular element, said circular element having compartments and comprising
(A) a toroidal stator which comprises the inner and outer radial walls, and a connecting side wall for said compartments formed in said element, said outer radial wall provided at a position near, but displaced from the top, with an inlet opening for said compartments, said inner wall provided substantially at the top thereof with an exit opening from said compartments, and
(B) a compartmented rotary element which includes
a rotatable disc mountable on a common axis with said stator and being rotatable with respect thereto and forming the second side wall for said compartments, said disc having removably secured thereto, in substantially equidistant perpendicular relationship, a plurality of compartment separating plates, said rotatable disc having means thereon for separable engagement with a drive means for said rotary element;
a common central axis for mounting said stator and said rotary element; and
driving means arranged to drive said rotary element in intermittent motion, whereby the dwell in the movement of said rotary element is arranged to align one of said compartments with said inlet opening and to align a second of said compartments with said exit opening, said drive means comprising a driver retractable from engagement with said rotary element thereby permitting said circular compartmented element to be lifted free of interference from said tank.

2. The apparatus of claim 1, wherein the support for said circular element comprises, on one side of said element, a two point connection between said stator and the tank rim and on the other side a third support on the central axis.

3. The apparatus of claim 1, wherein the resistance heating element, interposed between said tank and the circular element, is pivotally mounted so that upon removal of the circular element, the heating element is pivotable out of said tank.

4. The machine of claim 1, in combination with a product storage dispenser, wherein said combination is provided with electrical connection between the apparatus of claim 1 and the dispenser so that upon demand, as said dispenser presents a portion of food to said machine, said inlet is aligned with one of said compartments.

5. An automatic food preparing and dispensing system comprising the compartmented frying apparatus of claim 1 and including an order signal generating and storing means and wherein the apparatus of claim 1 is electrically connected so as to be responsive to said signal means.

6. A machine for cooking and dispensing portions of a food component such as French fried potatoes comprising:

a cooking station;
means to supply portions of a food component to said cooking station;
means at said cooking station to cook said food portions in a cooking oil;
means at said cooking station to regulate the temperature of said cooking oil;
a draining station;
means to convey said food portions from said cooking station to said draining station;
means at said draining station to drain said oil from said food portions;
means to conduct said oil from said draining station to said cooking station;
means to dispense said food portions from said draining station; and
mechanism for timing and coordinating the operation of said supply means and said cooking means to said conveying means and said draining means and said dispensing means; and in which said means to dispense said food portions from said draining station includes:
an assembly station to assemble said food portions on dishes,
means to convey said food portions from said draining station to said assembly station,
means to simultaneously convey dishes to said assembly station,
means to respectively assemble said food portions on said dishes.

References Cited

UNITED STATES PATENTS

| | | | |
|---|---|---|---|
| 1,153,177 | 9/1915 | Keast | 99—360 X |
| 1,579,676 | 4/1926 | Thompson | 99—360 |
| 1,630,676 | 5/1927 | Smith | 99—404 |
| 1,993,609 | 3/1935 | Kennedy | 99—404 X |
| 2,253,567 | 8/1941 | Kochenour et al. | 99—404 |
| 2,475,523 | 7/1949 | Schroeder | 99—404 |
| 2,585,213 | 2/1952 | Baker | 99—364 |
| 2,629,480 | 2/1953 | Williams | 198—209 X |
| 3,022,722 | 2/1962 | Arvan | 99—354 |
| 3,274,920 | 9/1966 | Benson | 99—404 |
| 3,296,954 | 1/1967 | Haub et al. | 99—404 |

BILLY J. WILHITE, *Primary Examiner.*